Patented Mar. 11, 1941

2,234,611

UNITED STATES PATENT OFFICE 2,234,611

COMPOSITE PRODUCT AND METHOD OF MAKING THE SAME

Harlan L. Trumbull, Hudson, Ohio, assignor to The B. F. Goodrich Company, New York, N. Y., a corporation of New York No Drawing. Application January 12, 1937, Serial No. 120,292

5 Claims. (Cl. 154—2)

This invention relates to the adhesion of polyvinyl halides to rubber, and has for its object to provide a method of treating rubber surfaces so that polyvinyl halides will firmly adhere directly to them.

Polyvinyl halides have many desirable properties which rubber lacks, such as resistance to sunlight, oxidizing agents, and petroleum products. A layer of a polyvinyl halide on the rubber would solve many of the difficulties connected with the use of rubber, but until the present time it has been impossible to adhere polyvinyl halides directly to rubber. I have discovered that if rubber is treated with a halogen or halogen derivative to form a layer of halogenated rubber in situ, a surface is produced which will adhere firmly to polyvinyl halides. In the term "polyvinyl halide," I include, in addition to polyvinyl chloride, bromide, and iodide, mixtures formed by the conjoint polymerization of one of these compounds and a small proportion of another polymerizable compound such as vinyl acetate. Though all such polyvinyl halides may be adhered to rubber by the method of my invention, polyvinyl chloride is specifically cited in this specification, because its great resistance to most materials deleterious to rubber makes it very important commercially.

The surface of the rubber, which may be either vulcanized or unvulcanized, may be halogenated by a number of different procedures. To form a chlorinated surface, the two methods which have given the best results are chlorination by chlorine gas in the presence of the vapor of a rubber solvent such as benzene, and the immersion of the rubber in chlorine water. Other methods which have provided satisfactory surfaces are painting with a solution of chlorine or hydrochloric acid in carbon tetrachloride or ethyl acetate, immersion of rubber in a hydrous hydrogen chloride solution, and exposing the rubber to sulfur chloride vapors. Corresponding treatments with bromine and iodine give equally satisfactory results.

The time of treatment with the halogenating agent varies with different rubber stocks and with different methods of halogenation. With some stocks adhesion may be obtained with a fifteen minute exposure, though longer treatments are usually necessary. If the halogenation is continued too long, the surface of the rubber becomes brittle and has a tendency to crack, making it impossible to obtain the best adhesion. I prefer to vulcanize the rubber, chlorinate the surface, and apply the layer of polyvinyl chloride. If a thin coating is desired, the polyvinyl chloride dissolved in a solvent such as chlortoluene or mesityl oxide may be sprayed or brushed upon the chlorinated surface. If I desire a thicker coating, I may spread a layer of polyvinyl chloride solution upon the chlorinated rubber and superpose a sheet of polyvinyl chloride of the desired thickness when the surface becomes tacky. Since unplasticized polyvinyl chloride films are rather brittle, I prefer to include a plasticizer such as tricresyl phosphate, dibutyl phthalate, or butyl phthalyl butyl glycollate. I may also include with the polyvinyl chloride carbon black, zinc oxide, clay, and other pigments and fillers commonly used in the rubber and plastics industries. I am able to adhere plasticized polyvinyl chloride to rubber so firmly that it requires a pull of from 45 to 60 pounds per linear inch to pull the film from the rubber.

The adhesion may be accomplished by molding the polyvinyl chloride to the chlorinated rubber surface by heat and cooling in the press. A chlorinated surface may be formed upon the surface of unvulcanized rubber, and the vulcanization and molding may be performed simultaneously. I may also partially vulcanize the rubber, chlorinate the surface, and complete the vulcanization when the polyvinyl chloride is molded to the rubber by means of heat. In these operations where heat is applied after chlorination, the chlorinated rubber surface is apt to scorch if heated at too high a temperature. For this reason, I prefer to accomplish the chlorination just before the polyvinyl chloride is applied, and to apply the polyvinyl chloride without heating.

As an example of a specific embodiment of my invention, I will show how I adhere a film of plasticized polyvinyl chloride to a rubber stock containing rubber 94.9 parts, all parts in this specification being by weight, zinc oxide 1 part, phenyl-beta-naphthylamine 1 part, and sulfur 3.1 parts. I cure this stock in a press for ten minutes at 290° F. I then expose it to chlorine gas in the presence of benzene for 5 hours. I spray a coating of a mixture of gamma polyvinyl chloride 75 parts, tricresyl phosphate 25 parts, and chlortoluene 1800 parts upon the chlorinated surface, and allow to dry thoroughly. The thin film is very strongly adhered to the chlorinated rubber surface.

In another embodiment, I immerse a cured rubber panel of the same composition in chlorine water for two hours. I wash the sheet with water and dry thoroughly. I then dip the panel in a 15% chlortoluene solution of gamma polyvinyl chloride 56.9 parts, tricresyl phosphate 42.6 parts and carbon black 0.5 part heated until it flows readily. This forms a firmly adherent film which is extremely tough, making it resistant to mechanical shocks as well as to chemicals which are injurious to rubber.

It will be understood that the term "rubber" is employed in a generic sense to include vulcanized soft rubber, gutta percha, balata, synthetic rubber, reclaimed rubber, etc., whether or not admixed with fillers, pigments, softeners, etc.

The halogenated surfaces which I form in situ on the rubber include substantial proportions of rubber halides such as rubber chloride, rubber bromide, rubber hydrochloride, brominated rubber chloride, etc.

While I have herein disclosed certain preferred manners of performing my invention, I do not thereby desire or intend to limit myself solely thereto, for, as hitherto stated, the precise proportions of materials utilized may be varied and other materials having equivalent chemical properties may be employed without departing from the spirit and scope of the invention as defined in the appended claims.

I claim:

1. The method of making a composite product which comprises chlorinating the surface of rubber and adhering plasticized gamma polyvinyl chloride directly thereto.

2. The method of making a composite product which comprises treating the surface of rubber with a free halogen and adhering plasticized gamma polyvinyl chloride directly thereto.

3. The method of making a composite product which comprises treating the surface of rubber with chlorine water and adhering plasticized gamma polyvinyl chloride directly thereto.

4. The method of making a composite product which comprises treating the surface of rubber with chlorine gas in the presence of benzene and adhering plasticized gamma polyvinyl chloride directly thereto.

5. A composite product comprising a rubber base portion with an integral chlorinated surface, and a firmly adherent contiguous coating of plasticized gamma polyvinyl chloride.

HARLAN L. TRUMBULL.

CERTIFICATE OF CORRECTION.

Patent No. 2,234,611.  March 11, 1941.

HARLAN L. TRUMBULL.

It is hereby certified that error appears in the printed specification of the above numbered patent requiring correction as follows: Page 2, first column, line 11, before "soft" insert --or unvulcanized--; and that the said Letters Patent should be read with this correction therein that the same may conform to the record of the case in the Patent Office.

Signed and sealed this 1st day of September, A. D. 1942.

(Seal)
Henry Van Arsdale,
Acting Commissioner of Patents.